Figure 1:
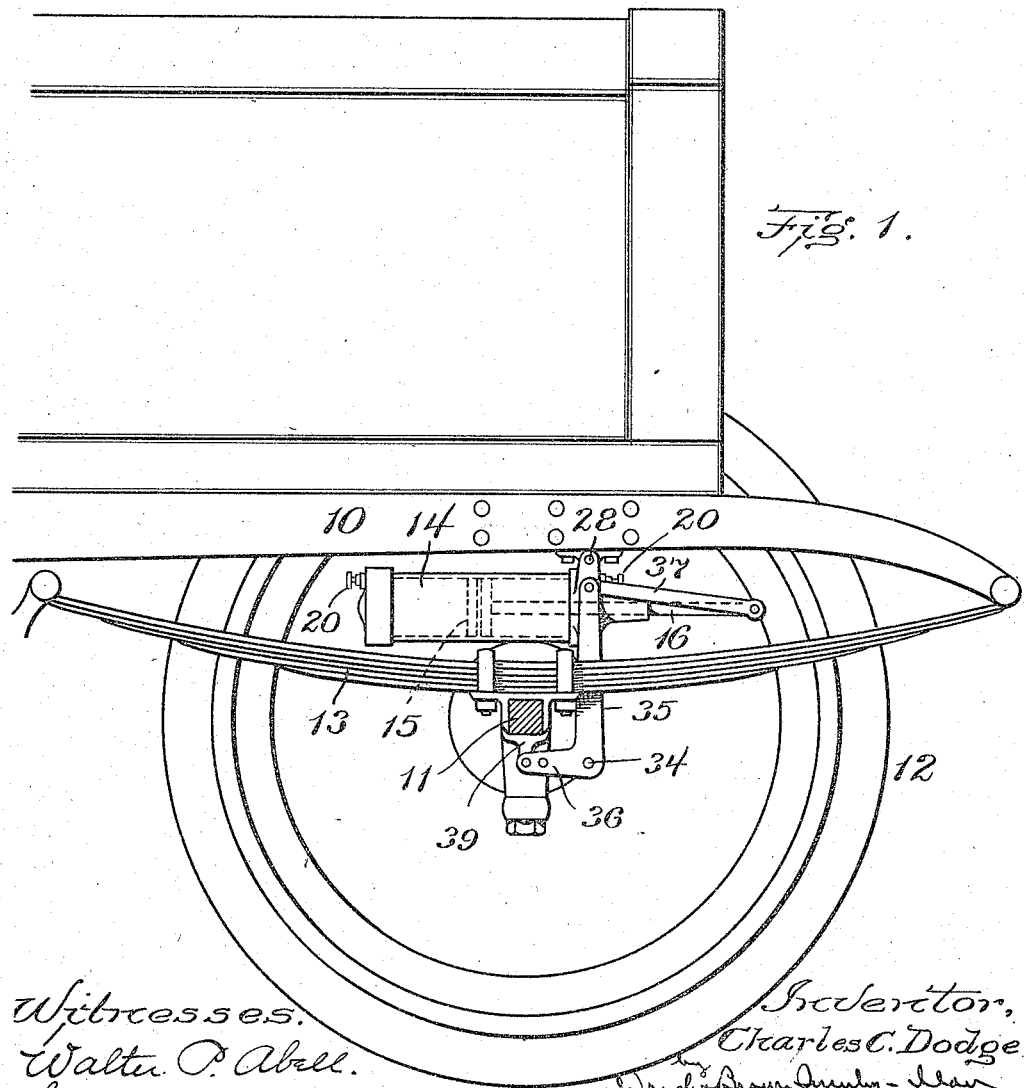

No. 881,227. PATENTED MAR. 10, 1908.
C. C. DODGE.
ANTIVIBRATION DEVICE FOR AUTOMOBILES.
APPLICATION FILED SEPT. 1, 1905.

3 SHEETS—SHEET 1.

Witnesses.
Walter P. Abell.
Lawrence E. Kennedy.

Inventor,
Charles C. Dodge
Attorneys.

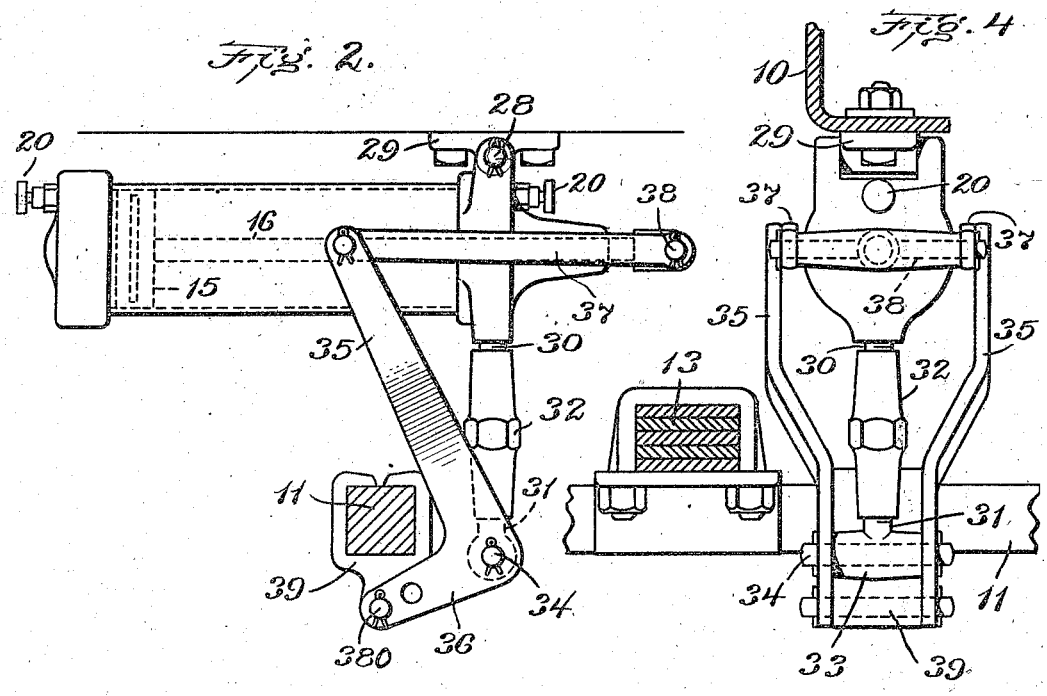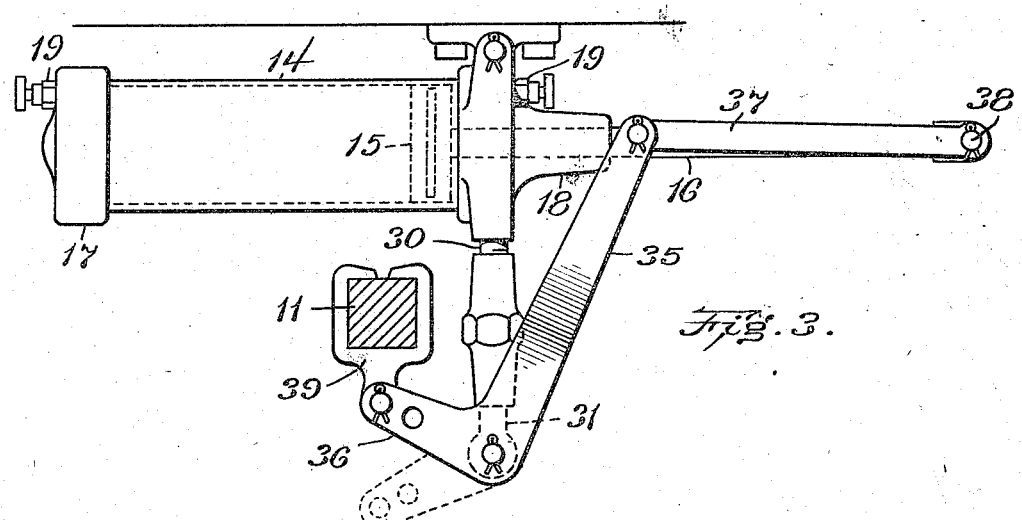

No. 881,227. PATENTED MAR. 10, 1908.
C. C. DODGE.
ANTIVIBRATION DEVICE FOR AUTOMOBILES.
APPLICATION FILED SEPT. 1, 1905.
3 SHEETS—SHEET 3.
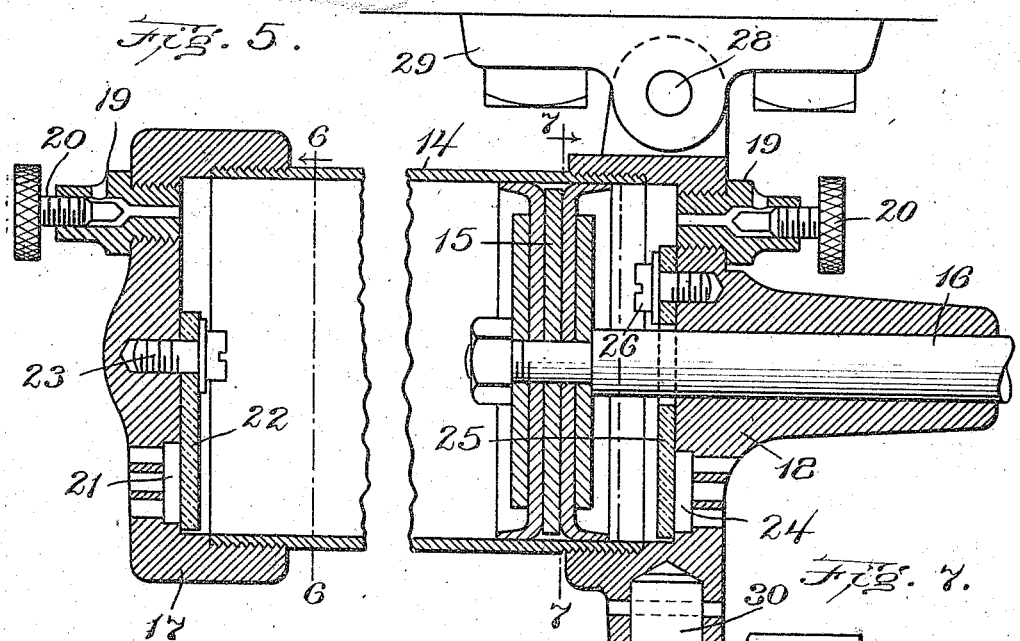
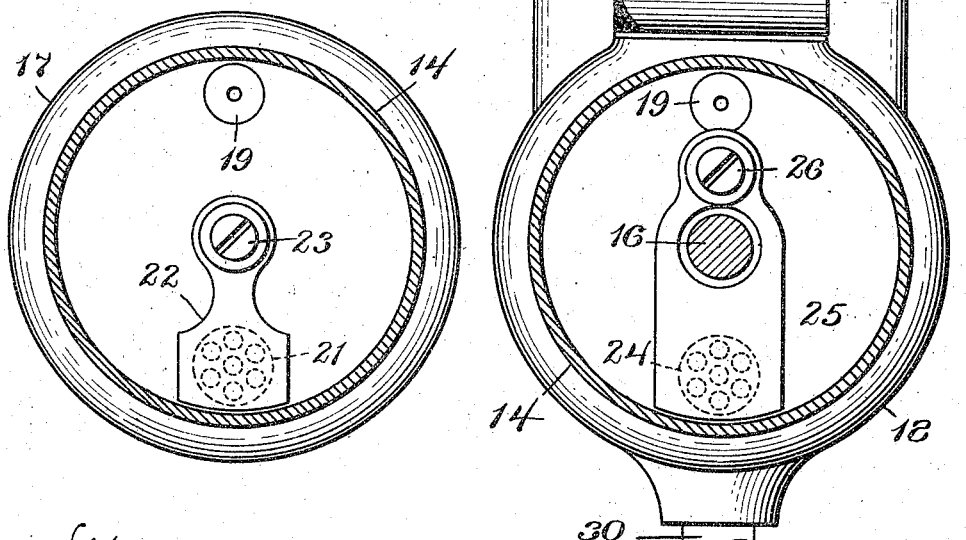
Witnesses:
Walter P. Abell.
Lamina E. Kennedy.
Inventor,
Charles C. Dodge
Attorneys.

UNITED STATES PATENT OFFICE.

CHARLES C. DODGE, OF NEWARK, NEW JERSEY, ASSIGNOR TO THE DODGE LUBRICATOR COMPANY, OF BOSTON, MASSACHUSETTS, A CORPORATION OF MASSACHUSETTS.

ANTIVIBRATION DEVICE FOR AUTOMOBILES.

No. 881,227.　　　Specification of Letters Patent.　　　Patented March 10, 1908.

Application filed September 1, 1905. Serial No. 276,671.

*To all whom it may concern:*

Be it known that I, CHARLES C. DODGE, of Newark, in the county of Essex and State of New Jersey, have invented certain new and useful Improvements in Antivibration Devices for Automobiles, of which the following is a specification.

In the development of automobiles or motor cars, much attention has been paid to instrumentalities for reducing vibration and jar of the car body, and it is generally the practice at this time to employ not only springs located between the car body and the axles, but also to employ pneumatic tires on the wheels. Attempts have been made to utilize solid rubber tires so as to avoid the danger and expense of punctures, but the solid rubber is not sufficiently elastic to prevent vibration of the car body when the vehicle is passing over a rough road.

It is the purpose of the present invention to provide mechanism which may be interposed between the relatively movable parts of a car such as the axle and the car body, for limiting or retarding the action of the vehicle springs while permitting them to yield sufficiently to compensate for inequalities in the road so as to reduce the vibration of the car body and also permit of the employment of solid rubber tires, with their corresponding advantages. I have stated that this device, which forms the subject of the present invention, may be located between the axle and the car body, but while this is the preferred arrangement, nevertheless it may be located in any convenient place where it can accomplish the functions for which it is intended.

The device itself comprises a piston and cylinder of which one may be connected to the car body and the other to the axle so that when the car body and the axle move relatively to each other, the piston is moved in one direction or the other to compress air in the cylinder and retard the action or destroy the synchronism of the spring and prevent the vibration of the car body.

In order to compress the air in the cylinder to a sufficient extent to secure the desired result, it is necessary to considerably multiply the relative movement of the body and the axle in its transmission to the piston, and hence the present invention comprises, in addition to the piston and cylinder interposed between said relatively movable parts or elements, power-transmitting devices by which the piston is caused to move a relatively long distance when the said parts or elements are moved a short distance from or toward each other.

The motion-multiplying or power-transmitting devices in the present embodiment of the invention consist of a two-armed or bell-crank lever having arms of unequal length, the short arm being connected to one of the relatively movable members and the long arm being connected to the piston, but it is equally apparent that any mechanical equivalent may be utilized in lieu of the said lever.

On the accompanying drawings,—Figure 1 represents a portion of an automobile equipped with my invention. Figs. 2 and 3 represent side elevations of the anti-vibration device, showing the piston in different positions. Fig. 4 represents an end elevation of the same. Fig. 5 represents a longitudinal section through the piston and cylinder. Fig. 6 represents a section on the line 6—6 of Fig. 5, looking in the direction of the arrow. Fig. 7 represents a section on the line 7—7, looking in the direction of the arrow.

Referring to the said drawings,—the body of the vehicle is indicated as a whole at 10. 11 indicates the axle having wheels, of which one is shown at 12. Between the axle and the body of the vehicle are springs such as indicated at 13 in consequence of which the body is yieldingly supported upon the axle, so that the said axle and body have a relative movement towards and from each other.

The device of which one form constitutes the embodiments of the present invention comprises a cylinder 14 and a piston 15. The piston is illustrated in Fig. 5 as of the double-cup type, and is connected to the piston-rod 16. The cylinder heads which are indicated at 17 18 respectively are each provided with similar screw-plugs 19 which are apertured to provide escape-ports for the air, each plug having a valve 20 for more or less opening or closing the ports to regulate the volume of air that is exhausted. The cylinder-head 17 is provided with a plurality of perforations constituting an inlet port or aperture 21 which is normally closed by a flap valve 22, secured in place in any convenient manner, as by a screw 23. The cylinder-head 18 has a similar inlet port 24 closed by a flap valve 25, which is apertured to permit the passage of the piston-rod 16 and which is secured in place by a screw 26 similar to that at 23.

The cylinder-head 18 is provided with ears or lugs 27 by which it may be secured through the medium of a pin or pintle 28 to a clip 29 secured to the under side of the car body. Depending from the cylinder-head 18 is a supporting member or strut which consists of two oppositely-threaded bars 30 31 connected by a turn-buckle 32. The bar or rod 31 is formed at its lower end with a transverse tubular bearing 33 to receive a fulcruming pin or pintle 34 which is utilized for a purpose to be described.

It will be observed by examination of Figs. 2 and 3 that the axis or median line of the rods or bars 30 31 intersects the axes of the pins 28 34 and is substantially perpendicular to the floor of the body, although the cylinder and the support are capable of oscillating slightly about the pin 28.

Fulcrumed upon the ends of the pin 34 are two bell-crank levers, the arms of which are indicated respectively at 35 36. The arms 35 are much longer than the arms 36 in the present case being substantially as 3:1. The ends of the arms 35 are connected by links 37 with the cross-head 38 attached to the end of the piston-rod 16. The short arms 36 are pivoted at their ends by a pin 380 to a clip 39 which is attached in any convenient manner to the axle 11. Preferably the arm 36 is adjustable with relation to the clip and to that end is provided with a plurality of apertures to receive the pin 380. From this description it will be apparent that when the axle 11 moves upward or downward relatively to the vehicle body, the bell-crank levers will be moved about the fulcrum pin 34 to move the piston in one direction or the other in the cylinder, the movement of the piston however being thrice as great as the movement of the axle so that the air will be sufficiently compressed during a relatively slight movement of the axle to effectually prevent a recurring vibration of the car body and of the vehicle spring.

In actual practice, the parts are so proportioned and adjusted to the vehicle that when the car has received its complement of passengers, the piston will be substantially midway between the ends of the cylinder. Consequently, in the event that a wheel passes over a stone and the axle is raised, the piston will be moved towards one end of the cylinder, its movement being checked as the air is compressed between it and the cylinder-head. Assuming that this movement be to the right in Fig. 5, the valve 25 will be immediately seated, the valve 22 will be opened by reason of the partial vacuum formed in the cylinder to the left of the piston, and air will rush into said end. The escape of compressed air to the right of the piston through the leakage duct will be gradual. In case the wheel should drop into a rut, the piston 15 will be moved to the left and the same results would be obtained as previously described.

It is intended that as many of these antifriction devices may be utilized as is necessary, as for instance, one for each vehicle spring.

Having thus explained the nature of the invention, and described a way of constructing and using the same, although without attempting to set forth all of the forms in which it may be made, or all of the modes of its use, I declare that what I claim is:—

1. An apparatus of the character referred to, comprising a cylinder, a support connected to the cylinder, means by which said support may be adjusted, a piston in the cylinder, bell-crank levers fulcrumed on said support and having relatively long and short arms, a piston rod, connections between said long arms and the piston rod, and means by which the cylinder and the short arms of the bell-cranks may be attached to two relatively movable parts of a vehicle.

2. An apparatus of the character described, comprising clips adapted to be attached to two relatvely movable parts of a vehicle, a cylinder pivoted to one of said clips, a two-armed lever fulcrumed on the cylinder and having one arm pivoted to the other of said clips, a piston in said cylinder, and a connection between the other arm of said lever and said piston.

3. An apparatus of the character described, comprising a cylinder having escape ports, and inlet valves at its ends, a piston in said cylinder, a piston rod, an elbow lever having arms of unequal length the longer arm being operatively connected with the piston rod, and means for connecting the cylinder and the shorter arm of the lever to two relatively movable parts of a vehicle.

In testimony whereof I have affixed my signature, in presence of two witnesses.

CHARLES C. DODGE.

Witnesses:
M. B. MAY,
C. C. STECHER.